United States Patent [19]

Linder et al.

[11] Patent Number: 4,753,725

[45] Date of Patent: Jun. 28, 1988

[54] SEMIPERMEABLE COMPOSITE MEMBRANES, THEIR MANUFACTURE, AND USE

[75] Inventors: Charles Linder, Rehovot; Mordechai Perry, Petach Tikvah; Reuven Kotraro, Rehovot, all of Israel

[73] Assignee: Aligena AG, Basel, Switzerland

[21] Appl. No.: 301,242

[22] Filed: Sep. 11, 1981

[30] Foreign Application Priority Data

Sep. 16, 1980 [CH] Switzerland ............ 6925/80

[51] Int. Cl.⁴ .................................... B01D 13/00
[52] U.S. Cl. ........................ 210/654; 210/500.42
[58] Field of Search .......... 210/654, 500.2, 321.1, 210/500.42; 264/41; 525/61, 56, 62

[56] References Cited

U.S. PATENT DOCUMENTS

| | | | |
|---|---|---|---|
| 3,276,996 | 10/1966 | Lazare | 210/654 |
| 3,556,305 | 1/1971 | Shorr | 264/41 X |
| 3,892,665 | 7/1975 | Steigelmann et al. | 264/41 X |
| 4,067,805 | 1/1978 | Chiang et al. | 210/654 X |
| 4,073,733 | 2/1978 | Yamauchi et al. | 210/500.2 |
| 4,076,538 | 2/1978 | Smith | 525/61 X |
| 4,247,401 | 1/1981 | Bloch et al. | 210/638 |
| 4,305,823 | 12/1981 | Batzer et al. | 210/654 X |

FOREIGN PATENT DOCUMENTS

2505254 7/1976 Fed. Rep. of Germany ... 210/500.2

*Primary Examiner*—Frank Spear
*Attorney, Agent, or Firm*—Ladas & Parry

[57] ABSTRACT

Semipermeable composite membranes containing on one surface of a porous support a superficial thin film having semipermeable properties. The film contains polyvinyl alcohol (PVA)/polyvinyl alcohol-copolymers (PVA-copolymers) modified by at least radicals containing ionizable groups are provided. The modification steps comprise e.g. reacting PVA/PVA-copolymer films with (a) a monomeric organic compound containing at least two functional groups,
(b) a linear or branched polyfunctional oligomer or polymer, and
(c) a compound containing cross-linking and ionizable groups.

The novel membranes show good mechanical, temperature and pH-stabilities and are suitable, for example, for separating monovalent ions of low ionic weight from polyvalent ions of low or high ionic weight or for separating ionic compounds from non-ionic compounds or from ionic compounds which have a different molecular weight or opposite charge. They can be used for example for separating salts from organic compounds (dyes) or in waste-water treatment.

34 Claims, No Drawings

SEMIPERMEABLE COMPOSITE MEMBRANES, THEIR MANUFACTURE, AND USE

The present invention relates to semipermeable composite membranes (for ultrafiltration and reverse osmosis purposes) which comprise a porous support and a superficial thin film having semipermeable properties, said film being formed of polyvinylalcohol (PVA) or PVA-copolymers modified by at least radicals containing ionisable groups.

Composite membranes are known in the literature as thin films upon a porous support, designed to impart mechanical stability. Polyvinylalcohol itself or in cross-linked form is known as membrane-forming material (cf. for example U.S. Pat. Nos. 3,837,500; 3,907,675; 4,073,733). These known unsupported PVA-membranes are normally too weak for practical purposes and show, due to their thickness, low fluxes only. Increased flux can be achieved by thinner membranes; these, however, show a still smaller mechanical stability and sometimes inadequate rejection, too.

It is an object of the present invention to provide improved composite semipermeable membranes which substantially overcome the disadvantages of the known PVA-membranes.

It has been found that optimum flux and rejection properties can be achieved with composite membranes which comprise, on a porous support, layers of a modified PVA/PVA-copolymer obtained as described hereinafter.

The membranes according to the present invention are chemically modified semipermeable PVA/PVA-copolymer membranes on a porous support which have pore dimensions such that they are, for example, permeable to lower-molecular weight salts of monovalent ions but reject polyvalent ions of high and low molecular weight or of high-molecular monovalent ions or non-ionic compounds.

Reverse osmosis (RO) membranes are dense membranes with pore diameters of 1-10 Å which effectively retain low-molecular salts, such as sodium chloride, and in particular retain these salts to the extent of more than 50% or preferably more than 90%. Ultrafiltration (UF) membranes have larger pore diameters, e.g. up to 1000 Å, and the rejection for the same low-molecular weight salts is less than 10%. Since these definitions tend to be arbitrary, there can be membranes which have pore diameters which give rise to a rejection of less than 50% and more than 10% for sodium chloride. Such membranes are classified between the RO membranes and the UF membrane.

The membranes according to the invention can be regarded either as UF membranes and/or as UF/RO intermediate membranes. They are composites of a thin layer on a porous support and the pore diameter of the membranes is for an average 10 to 1000 Å, preferably 10 to 500 Å and is particularly between 10 and 120 Å or 10 to 70 Å. The membranes are symmetric or asymmetric ones.

Usually pressures of more than 30 bars and preferably of 80 to 100 bars are used when working with RO membranes. UF membranes function best at below 10 bars and the RO/UF intermediate membranes function best at between 10 and 30 bars. The reasons for this lie in the pore size of the membranes. Small pores (RO membranes) mean that the membranes are dense membranes with a good resistance towards a reduction of flux under high pressures. The more widely open UF membranes do not display the same power of resistance when high pressures are employed. They would become compacted and have a significantly lower flux capacity, compared with the original membranes.

The inventive composite membranes show an improved mechanical stability in a broad pressure range over known UF-PVA membranes.

The membranes according to the present invention are prepared by modifying UF or RO/UF PVA-membranes by one or a sequence of different chemical reaction steps.

The present invention thus relates to novel composite semipermeable membranes containing, on one surface of a porous support, a superficial thin film having semipermeable properties said film comprising PVA/PVA-copolymers modified by at least radicals containing ionisable groups.

A further object of the invention is composite membranes wherein the superficial film of modified PVA/PVA-copolymer is obtained by casting an aqueous solution of a PVA/PVA-copolymer and optionally a leachable water-soluble additive on said porous support, optionally drying the film, treating it in an aqueous alkaline solution and rinsing it and reacting the film with (a) a monomeric organic compound containing at least two functional groups, (b) a linear or branched polyfunctional oligomer or polymer, and (c) a compound containing cross-linking and ionisable groups.

In an alternative reaction sequence the reaction with component (c) is carried out only if component (b) itself does not already contain ionisable groups. This proviso is always valid hereinafter when (c) is used as reactant.

It is another object of the present invention to provide composite membranes wherein the superficial film of modified PVA/PVA-copolymer is obtained by (I) casting an aqueous solution of PVA/PVA-copolymer, a crosslinking agent [(c') or (c'')] containing at least two functional groups and optionally ionisable groups, and optionally a leachable water-soluble additive on said porous support, optionally drying the film, crosslinking it, and then reacting it with optionally (II) (a) a monomeric organic compound containing at least two functional groups, (b) a linear or branched polyfunctional oligomer or polymer, and (c) a compound containing cross-linking and ionisable groups.

This last mentioned object comprises two composite membranes, one modified according to the steps summarised under (I), wherein the so-called cross-linking agent (c') contains at least two functional reactive groups as well as ionisable groups which can be anionic or cationic; membranes obtained according to this one-step-modification process (with respect to the chemical modification of the PVA's) contain at least two layers (coatings) of modified PVA's in the semipermeable film. The second membrane being modified by all the steps (I) and (II) (a), (b), (c) mentioned before, the cross-linking agent (c'') may be ionic (anionic and cationic) but even non-ionic; and at least one layer of cross-linked PVA's is necessary before starting the modification of (II).

A further object of the present invention comprises semipermeable composite membranes containing on one surface of a porous support a superficial thin film having semipermeable properties said film comprising at least two layers of PVA/PVA-copolymers modified with nonionic component (c") containing at least two functional groups.

The invention further relates (and these are other objects of the present invention) to improved methods for making the membranes mentioned hereinbefore having good rejection and separation characteristics (e.g. for high molecular weight vs. low molecular weight species; multiple charged ions vs. monovalent ions) and which are resistant to deterioration. A further object of the invention is the use of the new membranes for separating e.g. salts from organic compounds or purifying waste waters.

These and other objects of the present invention will be apparent from the following detailed description.

A suitable PVA is a high molecular weight hot water-soluble polymer hydrolyzed of residual acetate functions. A commercial product of this type is e.g. ELVANOL®-72-60 (Du Pont). Also giving good performance are higher and lower molecular weight, hot water soluble PVA's. If the molecular weight is characterized by the viscosity of a 4% solution at 20° C. using the Hoeppler falling ball method, then the preferred viscosity range is between 20 and 135 cP. Hot water-soluble material is preferred rather than material which will dissolve in cold water. The reason is that subsequent PVA coatings are applied from solutions at room temperature, and the dissolution of a dried layer into the casting should be prevented for best results. The said cold water insolubility is best achieved by having 98-100% hydrolysis of acetate function from PVA (PVA is made from polyvinylacetate by acetate hydrolysis) and relatively high molecular weight.

The polyvinylalcohols can be used in all their tactic forms, such as in isotactic, syndiotactic or preferably in heterotactic (atactic) form.

Suitable PVA-copolymers are e.g. those containing less than 30 (10) mole percent of comonomers, such as ethylene, methyl(meth)acrylate, acrylonitrile, vinylchloride, vinylpyrrolidone and/or itaconic acid, including block- and graft-copolymers as well as derivatives of these copolymers (e.g. acetylated copolymers).

Suitable components (a) which form the bridge member between PVA or PVA modified with (c') or (c") and the polyfunctional component (b) are monomeric compounds which possess cross-linking properties and can enter into chemical bonding both with PVA and with component (b).

These compounds, which have at least two functional groups, possess their reactivity by virtue of multiple bonds, epoxide groups, aziridine groups, aldehyde groups, imidate groups, isocyanate or isothiocyanate groups, hydroxyl, anhydride, acyl halide or N-methylol groups, (these bonds or groups can contain further substituents), or of substituents detachable as a tertiary amine or preferably as an anion, and combinations of these are also possible. The compounds contain, for example, the grouping

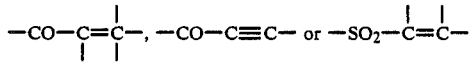

as a multiple bond, optionally further substituted. The isocyanate or isothiocyanate group can also be considered as a group of this type. Component (a) can contain quaternary ammonium groups, which are detached as tertiary amines, for example a trimethylammonium or pyridinium group or sulfonium groups, as the detachable groups. However, component (a) preferably contains substituents containing a radical detachable as an anion, and preferably containing a reactive halogen atom, as the reactive group. Such radicals which are detachable as an anion possess their reactivity by virtue of, for example, the influence of electrophilic groups, such as the —CO— or —SO$_2$-group in saturated aliphatic radicals. They also possess their reactivity by virtue of the influence of a quaternary nitrogen atom, such as in the group

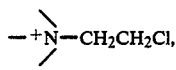

or in aromatic radicals by virtue of the influence of electrophilic groups in the o- and p-position, for example nitro, hydrocarbon-sulfonyl or hydrocarbon-carbonyl groups, or of the bond to a ring carbon atom which is adjacent to a tertiary ring nitrogen atom, as in halogenotriazine or halogenopyrimidine radicals.

Compounds which have proved particularly advantageous as component (a) are cyclic carbonic acid imidehalides and in particular halogenodiazine or -triazine compounds containing at least two reactive substituents. Tetrachloropyrimidine and in particular cyanuric chloride have proved particularly advantageous.

The cyclic carbonic acid imide-halides used here as component (a) are advantageously:

(A) s-Triazine compounds containing at least two identical or different halogen atoms bonded to carbon atoms, for example cyanuric chloride, cyanuric fluoride, cyanuric bromide and also primary condensation products of cyanuric fluoride or cyanuric chloride or cyanuric bromide and, for example, water, ammonia, amines, alkanols, alkylmercaptans, phenols or thiophenols;

(B) Pyrimidines containing at least two reactive, identical or different halogen atoms, such as 2,4,6-trichloro-, 2,4,6-trifluoro- or 2,4,6-tribromo-pyrimidine, which can be further substituted in the 5-position, for example by an alkyl, alkenyl, phenyl, carboxyl, cyano, nitro, chloromethyl, chlorovinyl, carbalkoxy, carboxymethyl, alkylsulfonyl, carboxamide or sulfonamide group, but preferably by halogen, for example chlorine, bromine or fluorine. Particularly suitable halogenopyrimidines are 2,4,6-trichloro-, 2,4-difluoro-5-chloro- and 2,4,6-tetrachloropyrimidine;

(C) Halogenopyrimidinecarboxylic acid halides, for example dichloropyrimidine-5- or -6-carboxylic acid chloride;

(D) 2,3-Dihalogeno-quinoxaline-, -quinazoline- or -phthalazine-carboxylic acid halides or -sulfonic acid halides, such as 2,3-dichloro-quinoxaline-6-carboxylic acid chloride or -6-sulfonic acid chloride, 2,6-dichloro-quinazoline-6- or -7-carboxylic acid chloride and 1,4-dichlorophthalazine-6-carboxylic acid chloride or acid bromide;

(E) 2-Halogeno-benzthiazole- or -benzoxazole-carboxylic acid halides or -sulfonic acid halides, such as 2-chloro-benzthiazole- or -benzoxazole-5- or -6-carboxylic acid chloride or -5- or -6-sulfonic acid chloride; and (F) Halogeno-6-pyridazonyl-1-alkanoyl halides or -1-benzoyl halides, for example 4,5-dichloro-6-pyridazonyl-1-propionyl chloride or -1-benzoyl chloride.

Further compounds which contain at least two reactive substituents and can be employed as component (a) are, for example, (G) Anhydrides or halides of aliphatic, $\alpha,\beta$-unsaturated mono- or di-carboxylic acids having preferably 3 to 5 carbon atoms, such as maleic anhydride, acryloyl chloride, methacryloyl chloride and propionyl chloride;

(H) Anhydrides or halides of aliphatic mono- or di-carboxylic acids having preferably 3 or 10 carbon atoms, or of aromatic carboxylic acids, containing mobile halogen atoms, for example chloroacetyl chloride, $\beta$-chloro-propionyl chloride, $\alpha,\beta$-dibromopropionyl chloride, $\alpha$-chloro- or $\beta$-chloro-acryloyl chloride, chloromaleic anhydride and $\beta$-chloro-crotonoyl chloride, and fluoro-nitro- or chloro-nitro-benzoic acid halides or -sulfonic acid halides in which the fluorine atom or the chlorine atom is in the o-position and/or p-position relative to the nitro group;

(I) Carboxylic acid N-methylolamides or reactive functional derivatives of these methylol compounds. Carboxylic acid N-methylolamides are in particular N-methylol-chloroacetamide, N-methylol-bromoacetamide, N-methylol-$\alpha,\beta$-dichloro- or -dibromo-propionamide, N-methylol-acrylamide and N-methylol-$\alpha$-chloro- or -$\alpha$-bromo-acrylamide. Reactive derivatives of the carboxylic acid N-methylol-amides are, for example, the corresponding N-chloromethyl- or N-bromomethyl-amides;

(J) Free or etherified N-methylolureas or N-methylol-melamines, for example N,N-dimethylolurea, N,N-dimethylolurea dimethyl ether, N,N'-dimethylolethylene- or -propylene-urea, 4,5-dihydroxy-N,N'-dimethylolethylene-urea or 4,5-dihydroxy-N,N'-di-methylolethyleneurea dimethyl ether and di- to -hexamethylolmelamine, trimethylolmelamine, dimethyl ether, pentamethylolmelamine-di- or -trimethyl ether and hexamethylolmelamine pentamethyl or hexamethyl ether;

(K) Condensation products of diarylalkanes containing at least one phenolic hydroxyl group and halogenohydrins, for example the diepoxide obtained from 2,2-bis-(4'-hydroxyphenyl)-propane and epichlorohydrin, as well as glycerol triglycidyl ethers and also corresponding diaziridines;

(L) Di-aldehydes, for example glutaraldehyde or adipaldehyde;

(M) Diisocyanates or Diisothiocyanates, such as alkylene ($C_2-C_4$) diisocyanates, e.g. ethylene diisocyanate, phenylene or alkyl ($C_2-C_4$)substituted phenylene diisocyanates, e.g. phenylene-1,4-diisocyanate or toluene-2,4-diisocyanate, or phenylene diisothiocyanates, for example phenylene-1,4-diisothiocyanate;

(N) Further reactive compounds, such as triacrylolhexahydro-s-triazine.

The compounds used as component (b) are as a rule polyfunctional oligomers or polymers which contain aliphatic or aromatic amino groups, which can be primary, secondary or tertiary amino groups; furthermore, these polymers can contain hydroxyl, thiol, isocyanate or thioisocyanate groups.

Examples of such polymers are polyethyleneimines, (M.W. 150 to 1,000,000) which can be partially alkylated (methyl iodide) or otherwise modified, polyvinylamine (molecular weight 1000 to 2,000,000), polyvinyl alcohol (molecular weight of 2,000 to 200,000) or partially esterified polyvinyl alcohol, cellulose derivatives, such as ethylcellulose, carboxymethylcellulose, hydroxymethylcellulose and hydroxyethylcellulose, and also polyvinylaniline (molecular weight 200 to 2,000,000), polybenzylamines, polyvinylmercaptan, polymers of 2-hydroxyethyl- or 2-aminoethylmethacrylates and copolymers, block polymers or graft polymers of these monomers and/or polymers and also further monomers and/or polymers, especially those containing ionic groups ($—SO_3^\ominus$, $—COO^\ominus$, $—^\oplus NR_4$). Examples of such polymers are the copolymers of styrenesulfonate (sodium salt)/vinylaniline, 2-aminoethyl methacrylate/acrylic acid, vinylaniline/vinylbenzyltrimethylammonium chloride or vinylamine/vinylsulfonate.

Preferred components (b) are water soluble and less preferable water insoluble components may also be used, such as, polyvinyl alcohols, cellulose derivatives, polyvinylamines and polyvinylanilines and preferably polyethyleneimines as well as the representative species of copolymers mentioned before.

In the aforementioned list of components (a) and (b), it is not expected that every compound or radical of (a) will react with every oligomer or polymer under (b). For example, functional groups of compound (b), containing alkyl amines, are generally more reactive to (a) than aromatic amines, or hydroxyl groups. Likewise, polymeric or oligomeric isocyanate or thioisocyanate (b) will not react with identical groups in (a), but must be chosen with such radicals of (a) where a reaction is possible (e.g. methylol or amine or hydroxyl containing radicals of (a) will react with isocyanate functions of (b)).

The ionisable groups are either already attached to the polyfunctional oligomer or polymer (b) or are introduced by means of component (c) or (c') ((c') in one-step modification), or are introduced with (b) and (c), wherein (c) contains at least one (preferably at least two) functional (reactive) group(s) while (c') contains at least two of them. The ionisable group (an anionic or cationic one) is bonded covalently and the counter ion is mobile and replaceable. An anionic bonded group is to be understood as meaning a group in which the negative ion is bonded to the molecule of the membrane and the counter ion is mobile and replaceable. In the case of a cationically ionisable group, the situation is reversed.

The counterions of the ionisable groups may be an important determinant in the flux/rejection properties of the final membrane. Potassium ions for example have resulted in membranes with higher fluxes, with equivalent rejection, than membranes formed with sodium counterions.

Suitable reagents (c) and (c'), respectively, for introducing radicals containing ionisable groups into the unmodified (or by a sequence of reaction steps premodified) PVA/PVA-copolymer membranes can be colourless or preferably coloured.

Reagents which contain an ionisable group can be colourless or coloured compounds, for example ionic reactive dyes, which can belong to various categories, for example anthraquinone, formazyl or preferably azo dyes which are optionally metal (chromium, copper, cobalt) complexes. Reactive groups which enable these reagents to be bonded to the polymeric (modified)

membrane substances are the following: carboxylic acid halide groups, sulfonic acid halide groups, radicals of α,β-unsaturated carboxylic acids or amides, for example of acrylic acid, methacrylic acid, α-chloroacrylic acid, α-bromoacrylic acid or acrylamide radicals, or of preferably low halogeno-alkylcarboxylic acids, for example of chloroacetic acid, α,β-dichloropropionic acid or α,β-dibromopropionic acid; radicals of fluoro-cyclobutanecarboxylic acids, for example of tri- or tetra-fluoro-cyclobutanecarboxylic acid; radicals containing vinylacyl groups, for example vinylsulfone groups or carboxyvinyl groups; radicals containing ethylsulfonyl ($-SO_2CH_2CH_2OSO_2OH$, $-SO_2CH_2CH_2Cl$) or ethylamino sulfonyl groups ($-SO_2NHCH_2CH_2OSO_2OH$) and halogenated heterocyclic radicals such as dihalopyridazonyl, dihalophthalazines, halobenzothiazoles and preferably dihaloquinoxalines and halogenated pyrimidines or 1,3,5-triazines such as monohalotriazines, dihalotriazines, 2,4-diahlopyrimidines, 2,4,5- or 2,4,6-trihalopyrimidines. Suitable halogen atoms are fluorine, bromine and especially chlorine atoms.

Examples of reactive groups present in component (c) and (c') are monochlorotriazinyl, dichlorotriazinyl, 2,4-dichloropyrimidinyl, 2,3-dichloroquinoxaline-6-carbonyl, 4,5-dichloro-pyridazonlypropionyl, 1,4-dichloro-phthalazine-6-carbonyl, chlorobenzothiazole linked to the dye via $-CONH-$, $-SO_2NH-$, $-NH-Ar-N=N-$ (Ar=phenylene or naphthylene), 5-chloro-4-methyl-2-methylsulphonyl pyrimidinyl, vinylsulphonyl, β-sulphato ethylsulphonyl, β-sulphatoethyl aminosulphonyl, β-chloroethylsulphonyl or β-sulphatopropionamido.

Mostly preferred components (c) and (c') are reactive azo dyestuffs containing sulphonic acid ($-SO_3H$) or carboxyl ($-COOH$) groups (either group may be also present in salt form, such as an alkali metal salt, (sodium salt)) and as reactive groups monochlorotriazinyl, dichlorotriazinyl, 2,4-dichloropyrimidinyl, 2,3-dichloroquinoxaline-6-carbonyl, vinyl sulfonyl, β-sulfatoethylsulfonyl, β-chloroethylsulfonyl or β-sulfatoethylaminosulfonyl radicals. Those components (c) and (c') containing at least two reactive groups are preferred.

The compounds (c") are those mentioned for (c') (containing at least two functional groups) and in addition non-ionic compounds containing at least two functional groups, e.g. those mentioned as components (a).

An effective reagent may cross-link via chemical bonds, electrostatic interactions of ionic groups and by chelation or coordination of polymeric functions with metal ions. The preferred mode of cross-linking is via a covalent bond, though the other two modes may also be used. In some cases all three modes of cross-linking may be operative.

Ionisable groups which the membrane-modifying substances (or the membranes obtained after modifying) can contain are, for example, sulfato groups, sulfonic acid groups, carboxylic acid groups, ammonium groups formed from primary, secondary or tertiary amino groups and hydrogen, or quaternary ammonium groups and also phosphonium or sulfonium groups. Particularly advantageous results are achieved with substances containing sulfonic acid groups.

The membranes which contain, at least, at the membrane surface an oligomer or polymer (b) modified by an azo dye containing sulfonic acid groups are particularly valuable and versatile in use. The azo dye can also contain a metal, for example copper, bonded as a complex.

Furthermore, it is also possible to introduce the charged groups into the membrane by reacting reagents, such as alkyl halides or benzyl halides, with an amino group of the polymer (b) chain. In this way, for example, the polyethyleneimine radical can be modified by methyl iodide or dimethyl sulfate. On the other hand, the modification can also be effected with chlorosulfonic acid itself.

The manufacture of the inventively used modified PVA is carried out, as a rule, with aqueous 2.5 to 10% PVA solutions.

Preferred are concentrations of from 2.5 to 5% wherein a level of about 5% was found to be mostly preferred. The viscosity of such a solution was found to be 55 to 65 cP (4% solution at 20° C., Hoeppler Falling Ball Method).

To these PVA solutions components (c')/(c") (after purification) are added in form of an aqueous solution at temperatures of about 40° to 90° C. Before casting them on a porous support they are filtered through a submicron filter to eliminate dust particles. Components (c')/(c") (e.g. the reactive dyestuff) can be purified by usual purification and extraction steps in order to remove e.g. excess salts.

The function of the porous support is to impart mechanical strength to a mechanically weak membrane which controls the flux and rejection properties of the composite system. Suitable support materials are water-insoluble and may be chosen e.g. from polyacrylonitriles, polysulfones, polyamides, polyolefines such as polyethylenes or polypropylenes, or cellulosics. The pore size of the support should not be so large as to permit a rapid incorporation of the casting solution into its pores, thus resulting in membranes with relatively low flux. In such cases a pore protector (e.g. paraffin oils, silicone oils, mineral oils or chloroform) may first be incorpoated into the pores and then the PVA solution coated upon this substrate. The pore protector is subsequently removed by a solvent which thus does not affect the PVA.

The process for manufacturing the inventive composite membranes comprises casting on one surface of a porous support, an aqueous casting solution containing PVA (PVA-copolymer) and an ionic compound containing at least two functional groups, passing a stream of warm air over the support during casting, evaporating the water, drying the coating, and treating the membrane in an aqueous alkaline solution.

By choosing the concentration of the polymer solution cast and the temperature of evaporation, a minimum amount of penetration of the coating polymers will occur resulting in high flux membranes. Supports with diameters which are too small will impede solvent flow and thus require higher pressures to achieve practical fluxes. Average pore sizes between 0.05 and 0.3 micron form suitable supports, and the preferred support is a (micro)porous material of polypropylene (CELGARD ®-3501-Celanese) with rectangular pore dimensions of 0.04 to 0.2 micron.

After casting a PVA-dye solution the water is evaporated to form a dry membrane. If the rate of evaporation is too slow solution will penetrate into the porous support, or partially dissolve an already dried layer. In both instances the resultant composite will have relatively low fluxes and rejection. A rapid evaporation rate can be achieved by blowing hot air of 70° to 150°, preferably of 70° to 110° C. and particularly of 80° to 90° C. across and onto the membrane immediately after casting a given layer. In such a way optimum results are achieved. Drying (at about 70° to 90° C.) takes less than a second and another layer may be cast immediately afterwards.

The thickness of a single wet layer should be in the range of 2 to 15 microns, after drying resulting in 0.2 to 2 microns. The wet thickness is determined by the solution concentration and drying rate needed to achieve a rapid evaporation and minimum pore penetration. It was found that a glass rod resting on the porous support and pulled from behind a quantity of casting solution spreading in the said solution gives good results. Similar results can be obtained by casting successive layers with doctor knives, gravure coating, roll air knives or meniscus coaters.

The number of layers cast determines the flux/rejection properties of the final composite. When there is only the one-step modification (PVA/PVA-copolymer+(c') or (c")) at least two layers should be used to form the semipermeable film. If too few layers are coated upon each other the rejection is low and flux high. If too many are coated the rejection is high but the flux is low. The optimum number of layers is of course a function of the thickness of each layer, which in turn depended on solution concentration and wet film thickness. Very thin layers require a greater number of coatings than thicker. In general 4 to 6 coating layers prepared with a 5% PVA/PVA-copolymer solution with a glass rod have been found to give optimum results.

Cross-linking of the PVA/PVA-copolymer-dye membranes is carried out in an aqueous alkaline solution, such as a sodium carbonate solution at elevated temperature. Sodium carbonate concentrations of at least 20% give optimum results. A temperature range between 60° to 90° C., preferably between 78° to 83° C. is suitable, while the immersion time is between 10 to 30 minutes, preferably about 20 minutes. Higher or lower temperatures for the same time of immersion give somewhat poorer results.

The total thickness of all the layers of modified PVA/PVA-copolymer on the porous support should be in a range of from 0.4 to 10, preferably of from 1 to 6 micron.

The pore size of the semipermeable film of modified PVA/PVA-copolymer on the porous support is about 10 to 1000 Å, preferably 10 to 200 Å and particularly 10 to 120 Å.

The so modified (with or without ionisable groups) PVA/PVA-copolymer after being cast on a porous support to form a membrane can be further reacted with different chemical reactants, for example by the following sequence of reaction steps in this order:

(a) with a monomeric organic compound containing at least two functional groups, (b) with a linear or branched polyfunctional oligomer or polymer and (c) with compounds containing cross-linking and ionisable groups.

The reactive compounds (c) contain at least one (preferably at least two) reactive group(s). The process for the manufacture is carried out under such conditions that the reaction product obtained from PVA (modified with (c') or (c")) after being cast as a membrane and component (a) still have at least one reactive group each; this reaction product is then reacted with (b) and further with (c) which contains at least one ionic group and preferably at least two groups capable of reaction with component (b).

The procedure for the preparation (further modification) of those membranes which are obtained by casting the PVA-component (c')/(c")-mixture on a porous support is started by introducing the membrane into a solution which contains component (a), which reacts with the hydroxyl groups of the starting membrane. The reaction conditions are so chosen that not all of the reactive functional groups of component (a) are consumed. The unconverted groups in component (a), which is now bonded to the membrane, are then reacted with the polymeric or oligomeric, polyfunctional component (b). It is also possible for some of the molecules of reactive component (a) to react with more than one hydroxyl group of PVA, so that the membrane becomes further crosslinked. By monitoring the reaction conditions, such as concentration, reaction time, temperature and pH value, the proportion of the polyfunctional reactive molecules which crosslink (and thus bond more than one hydroxyl group) can be controlled. After this reaction, the membrane is removed from this solution and introduced into a second solution, which contains component (b). Some of the functional groups of component (b) are now further reacted with the reactive groups of the reaction product of PVA and (a), whilst other groups remain free for further reactions. The variables in this reaction stage (duration, concentration, temperature and pH value) depend on the polymerisation product or molecule to which component (b) is bonded. The purpose of this reaction stage is further cross-linking of the membranes and the introduction of oligomeric or polymeric (polyfunctional) molecules at the surface of the membranes, which can be further reacted. In the final step of the modification of the membranes the coss-linking of (b) is carried out and ionic groups are also introduced by further reacting the reaction product of PVA/PVA-copolymers and components (c') or (c"), (a) and (b) with an aqueous solution of component (c).

The individual reactions are as a rule carried out using 0.5–30% solutions of each of the components; the reaction steps each take 1–150 minutes.

If component (a) is, for example, cyanuric chloride, approximately 0.5 to 10% solutions in petroleum ether (boiling range 40° to 200° C.) or in another solvent which does not dissolve the membrane, can be allowed to act for 5 minutes to 4 hours on the membrane which has previously been treated with alkali, for example sodium bicarbonate solutions. The reaction time is shorter if more highly concentrated solutions of component (a) are used. After intermediate rinsing, the membrane can then be allowed to react with, for example, polyethyleneimine (component (b)), which is initially introduced as a 5 to 20% aqueous solution, the pH value of which has been adjusted to 8 to 12, for example using hydrochloric acid. The reaction time can be from about 10 minutes to 4 hours and the reaction temperature can be about 0° to 40° C. After further intermediate rinsing with water, the reaction with component (c), for example a reactive dye, is then carried out and the reaction can be carried out in one or two stages. In the two-stage process, the membrane is immersed for about 5 to 30 minutes in a dye/salt solution (for example dye (0.5–3%)/sodium chloride (5–15%)) and the temperature can be about 20° to 40° C. and the pH value of the solution can be about 5.0–7.0.

The membrane is then removed from this solution and immersed in another solution, the pH value of which has been adjusted to about 10 to 11.5 (for example using sodium carbonate or another alkaline compound), and the reaction of the dye with the membrane takes place in this second solution. Reaction temperature: 20° and 40° C.; reaction time: 0.5 to 1.5 hours. In the single stage process, the adsorption of the dye onto the membrane and the chemical reaction with the membrane take place in the same solution. The reaction conditions correspond approximately to those indicated above, but the dye concentration can be in the range of 1 to 10%, whilst the reaction time is 0.5 to 2 hours.

Methyl iodide or another alkylating agent can be employed in order to quaternise the amino groups of the bonded polyethyleneimine (cationically modified membranes) instead of reacting the membrane with the dye as described above.

The inventive composite membranes made by multiple casting of thin layers of an aqueous solution of PVA/PVA-copolymer and a compound containing ionisable groups (reactive dyestuff) onto a porous support (as well as those membranes obtained by a sequence of reaction steps as described hereinbefore and hereinafter) show excellent flux and rejection properties and also good pH- and mechanical stabilities. For example the inventive membranes have been shown to operate at pH-values between 2 and 13 for up to about 3000 hours at temperatures up to 50° C.

Operation conditions beyond these figures (e.g. at higher or lower pH-values and higher temperatures—up to 90° C., preferably up to 70° C.) are also possible.

The sequence of the modification steps (a) to (c) described above can be applied to any PVA membrane with a pore size distribution in the range of 10–1000 Å. For example, membranes described in U.S. Pat. No. 4,073,733 are prepared from a casting solution of PVA polymers belonging to the group of vinyl alcohol homopolymers having an average degree of polymerization in the range of 500 to 3,500 and a degree of saponification in the range of 85 to 100 mole percent; PVA copolymers containing less than 30 (10) mole percent of such monomers as ethylene, vinyl pyrrolidone, vinyl chloride, methyl methacrylate, acrylonitrile and/or itaconic acid (including random, block and graft copolymers) and derivatives of said homopolymers and copolymers, such as partially acetylated polymers and copolymers; said solutions containing a water-soluble additive such as polyalkylene glycol having an average molecular weight in the range of 400 to 4,000 and, preferably, in the range of 600 to 3,000, and have a carbon-to-oxygen ratio of not more than 3, or other high B.P. (boiling point) water-soluble organic compounds containing hydroxyl, amide or amino groups such a polyvinyl pyrrolidone, glycerine, N-ethanol acetamide or N-ethanol formamide.

Said membranes have an asymmetric or symmetric structure comprising a porous layer with a distribution of pores in the range of 0.02 to 2 μm with an interpore wall thickness range from 50 to 5000 Å, said porous layer is provided with a denser thin superficial skin.

It is therefore another object of the present invention to provide a method for further modification of said skinned membrane or otherwise dense layer having a similar pore size distribution to that distribution to that described above, i.e. from 10 to 1000 Å. This method comprises casting an aqueous solution of a polyvinyl alcohol (polyvinyl alcohol copolymer) and a leachable water-soluble additive on one surface of a porous support optionally drying the film, treating it in an aqueous alkaline solution and rinsing it and reacting the film with (a) a monomeric organic compound containing at least two functional groups, (b) a linear or branched polyfunctional oligomer or polymer, and (c) a compound containing cross-linkable and ionisable groups.

The method of preparation of the above-mentioned membranes includes casting a layer of a solution containing (5) 10–20% of PVA/PVA-copolymer and of a leachable water-soluble additive into a coagulation bath of concentrated sodium hydroxide. Said additives can be used in up to twice the amount of PVA/PVA-copolymer thus determining the porosity of the skinned layer. Optionally, a complete drying of the casting solution followed by subsequent leaching in said coagulation bath results in a uniformly distributed porous dense layer.

The coagulation of these membranes in the alkaline solutions insolubilizes the membrane and fixes its structure, thus enabling further modification. Further cross-linking of the membrane occurs during stage (a) as described above, thus imparting to the membrane additional compaction stability. Due to the fact that the cross-linking reaction occurs mainly upon the exposed surface area of the membrane, the efficiency of this step is limited. This can be further improved by adding a cross-linking agent (compound (a) or (c')) directly into the casting solution, resulting in membranes with improved compaction stability. The use of component (c') is preferred for those compounds which are compatible with the casting solution (e.g. are not precipitated). This modification process is a further object of the present invention which comprises (I) casting an aqueous solution of PVA/PVA-copolymer, a cross-linking agent and optionally a leachable water-soluble additive on one surface of a microporous support, optionally drying the film, cross-linking it and then reacting it optionally with (II) (a) a monomeric organic compound containing at least two functional groups, (b) a linear or branched polyfunctional oligomer or polymer, and (c) a compound containing cross-linkable and ionisable groups.

For example, a casting solution containing 16% PVA, about 4% polyethyleneglycol (M.W. 2000) and 0.5% of cyanuric chloride, dissolved in a mixture of 9:1 acetone/water at 0° C., could be used for casting membranes upon a CELGARD ® porous support, as described above, and crosslinking at alkaline conditions at room temperature. Further modification via stages (a) to (c) or optionally stages (b) to (c) resulted in high flux, high rejecting membranes. This casting solution could be used without difficulty for 10 to 20 hours.

Depending on their use, the membranes may have various forms. For example, they may be in the form of a plate, a leaf, a tube, a bag, a cone, or of hollow fibers. They may be incorporated in spiral wound, tubular or plate and frame modules. If heavy pressure is exerted, the membranes can, of course, be supported by a wire sieve or a perforated plate, nonwoven cloth, paper, etc.

The membranes of the present invention can be used in principle for the following purposes:

(a) The separation of charged (ionogenic) molecules from uncharged molecules;

(b) The separation of oppositely charged molecules;

(c) The separation of charged ionogenic substances with different molecular weights and/or different quantity of charge, including those having the same charge.

The following uses are especially advantageous:

(1) The separation of organic and also of metalloorganic ionogenic substance (dyestuffs, metal-complex dyestuffs) from the byproducts of the reaction mixtures and other substances contained therein, for example of salts, such as sodium chloride, sodium sulfate or sodium acetate.

(2) The separation of heavy metal complexes from salts which do not form complexes, e.g. in the treatment of effluents.

(3) The purification of the effluents occurring in production and application of dyestuffs.

(4) The separation of proteins or hormones which have similar molecular weights, but opposite charges.

(5) The separation of ionic tensides (detergents, wetting agents or dispersing agents) from other chemicals which are present in the reaction mixture after production of the tensides. (By-products, excess of starting products).

(6) The removal of ionogenic tensides from effluents.

(7) The separation of ionogenic molecules from water, that is concentration of aqueous solutions that contain metal complexes, tensides, dyes or proteins, whereby better results in respect of efficiency (flow per unit of time) and separation effect are obtained by comparison with the conventional membranes.

The processes for separating the substances (and this is another subject of the present invention) comprise in general directing aqueous solutions of mixtures of substances under pressure (reverse osmosis) through a semipermeable membrane as described hereinbefore. More particularly processes for concentrating and/or purifying liquids or separating components dissolved in these liquids are involved which comprise disposing on one side of an inventive semipermeable membrane a solution with a solute and applying a hydraulic pressure against said solution and said membrane, said pressure being greater than the osmotic pressure of said solution.

The separation effect (the rejection) of the membranes can be measured as follows: A circular membrane with a surface area of 13 cm² lying upon a fine mesh wire net made of stainless steel, is inserted into a cylindric cell of stainless steel. 50 ml of the solution to be investigated, containing the test substance in a concentration $c_1$ (g substance in g solution) is put on the membrane in the steel cylinder and subjected to a nitrogen pressure of 30 bars. The solution is stirred magnetically. The solution on the exit side of the membrane is examined for the concentration of the test substance $c_2$ by withdrawing three samples of 5 ml each from the start of the experiment. The rejection can be calculated from the following equation:

$$R = \frac{c_1 - c_2}{c_1} \cdot 100(\%)$$

The flux (F), in effect the volume of material permeating though the membrane per unit of surface area and time is:

$$F = V \cdot A^{-1} \cdot t^{-1}$$

where
F=flux
V=volume
A=membrane surface area
t=time.

The flux (F) may be expressed in m³/m²·d, that is cubic meters per square meter per day, or, alternatively l/m²·h (i.e. liters per square meter of membrane per hour).

In addition to the measurement of the flat membranes described above, 60 cm membrane tubes with an outer diameter of 1.38 cm were investigated. The said tubular membranes are placed in a perforated stainless steel holder of outer diameter of 2.0 cm and inner diameter of 1.40 cm, and this is placed in a polycarbonate tube of inner diameter of 2.75 cm. The feed pressurized at 30 bars is introduced into the supported tubular membranes at a circulating rate of approximately 14.75 l/min.

The stream permeates under these conditions through the tubular membrane supported by the perforated stainless steel tube to the permeate side. The calculation of rejection (R) and flux (F) is the same as for flat membranes.

In the following Examples these dyes and other components are used for modifying the polyvinylalcohol membrane (components (c), (c') and (c″)):

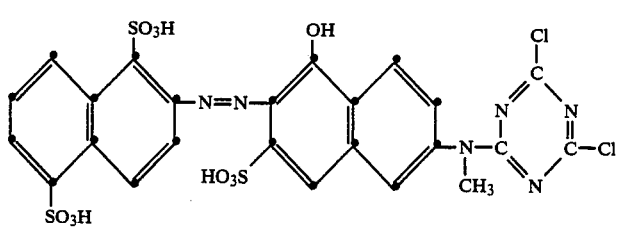

(1)

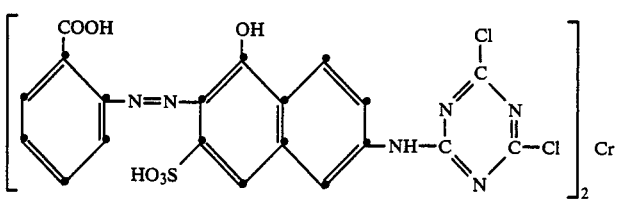

(2)

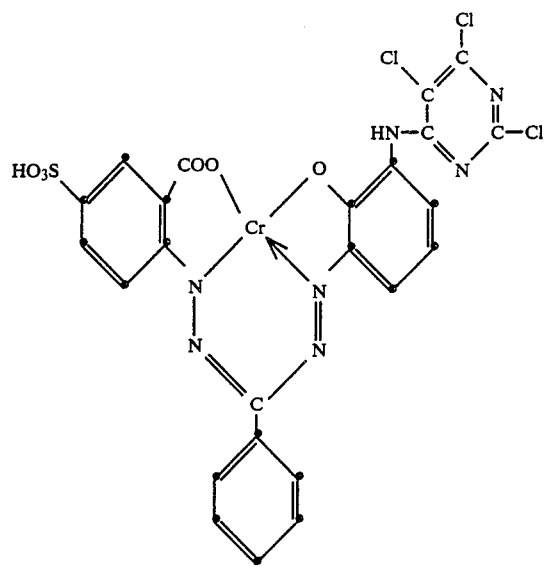
(3)
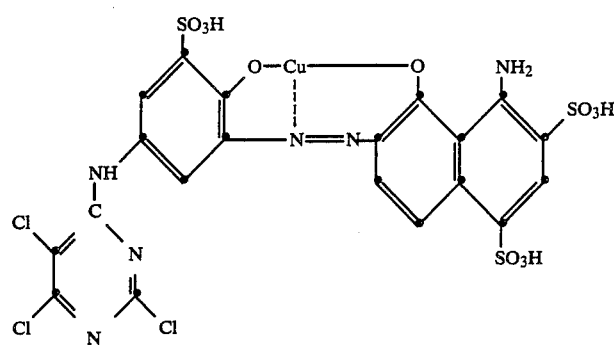
(4)
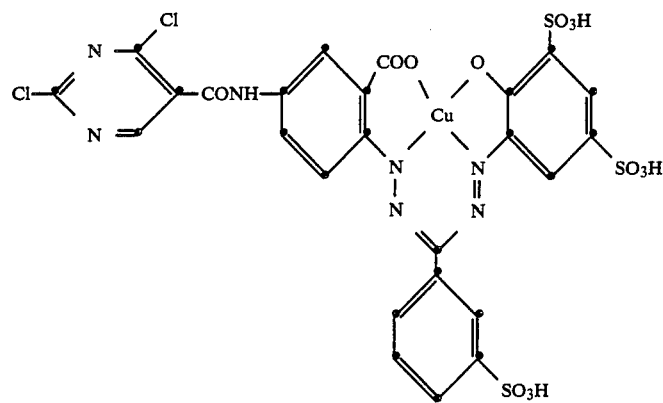
(5)
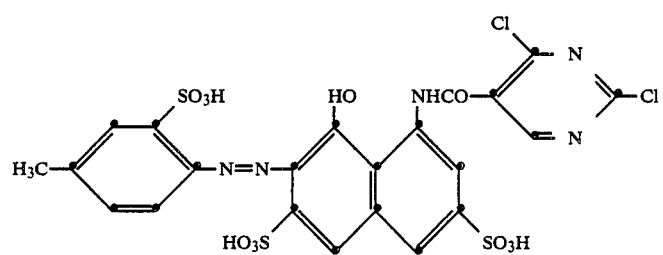
(6)

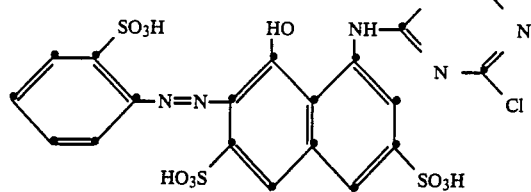
(7)
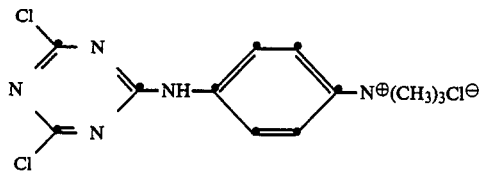
(8)
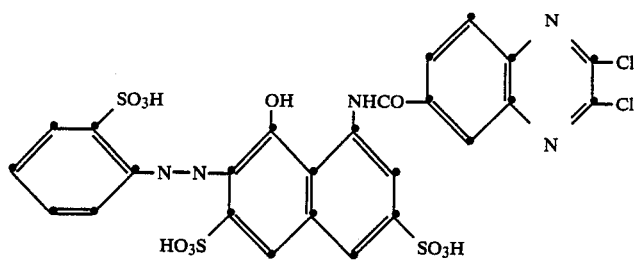
(9)
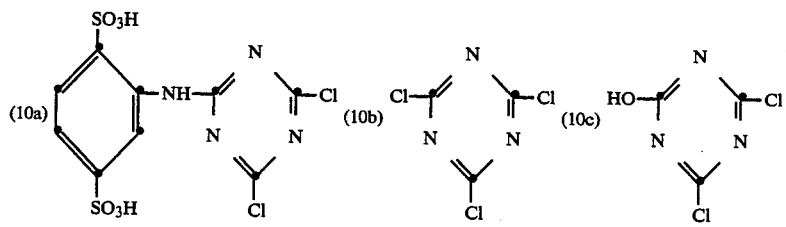
As test dyes for testing flux and rejection properties of the inventive membranes the following dyes are used:
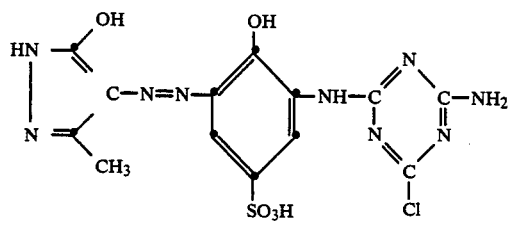
(11)
1:1 mixture
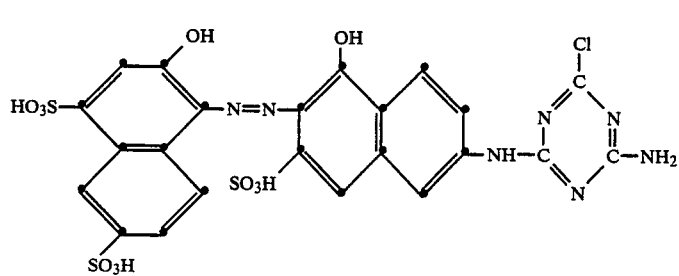

-continued

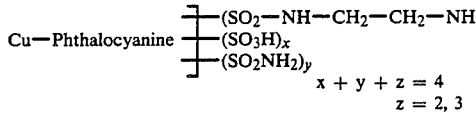
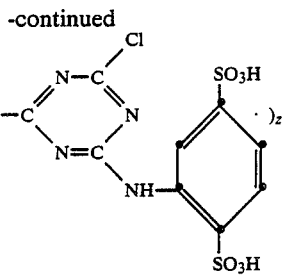
(12)

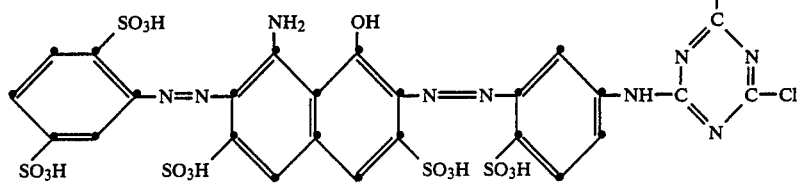
(13)

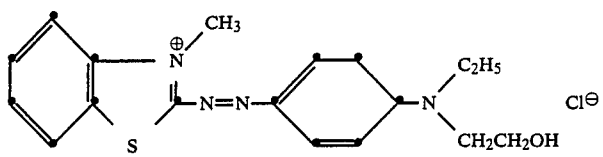
(14)

EXAMPLE 1

5.1 g of Polyvinylalcohol (PVA) (ELVANOL®-grade 72-60G) is placed into 100 g deionized water at ambient temperature, stirred to disperse the PVA particles, and heated (70°–90° C.) until a clear solution is obtained. To this solution, at 70° C., 6.12 g of purified dye of formula (1) is added, and the solution is stirred for 5 minutes, cooled to 60° C. and filtered through a series of filters of 20 micron, 5 micron and 0.3 micron, respectively, at a pressure of 2 bar. The dye is purified by the following procedure: 450 g of acetone are added to 60 ml of dye solution (25%) and mixed for 10 minutes. The mixture is allowed to precipitate for one-half hour, and the upper layer decanted. Another 450 g of acetone are added and mixed for 10 minutes. The solution is filtered over filter paper (Whatman No. 42), the precipitate is washed with acetone, and dried in vacuo at 60° C. for 2 hours. Yield of procedure: about 85%.

The above solution is then used to cast on a porous support of polypropylene (hydrophilic CELGARD®-3501 from Celanese Plastics Co. described above). A strip of this support (5×20 cm) is adhered with slight tension at both ends with pressure-sensitive tape to a glass plate. 5.0 ml of PVA casting solution is applied to one end, and a glass rod pulled from behind this solution down the length of the support strip, while the said rod rests on the support. The PVA solution is thus coated upon the support. During this process, a stream of warm air (70°–80° C.) is passed over the support, evaporating the water and drying the PVA coating. The evaporation time is less than 1 second. This process is repeated 4 times and the coated support is then described as a composite membrane having four coatings of PVA. Instead of a glass rod, a casting bar with one layer of closely wound wire (0.1 mm in diameter) may be used.

The PVA support strip is removed from the glass plate and completely immersed in an aqueous solution of 20% sodium carbonate at 80° C. for 20 minutes, rinsed with water till all sodium carbonate has been removed, and stored dry prior to testing. The sodium carbonate step crosslinks and fixes the PVA and dye molecules.

Discs 13 cm$^2$ in area are cut from this strip and placed in a pressure cell for testing flux and rejection properties of different solutes.

As a means of comparison between the above composite membranes and dense unsupported membranes, the latter are formed from the aforementioned PVA on a glass plate by spreading the PVA-dye solution along the length of the plate by pulling from behind the PVA solution a stainless steel bar having a clearance from the circumference of the bar to the glass plate of 0.2 mm. This is carried out in an oven at 70° C., and the cast solution is left in the oven for ½ hour, resulting in a dried membrane. The dried membrane, while on the glass plate, is immersed in the above-mentioned solution of sodium carbonate for crosslinking under the same conditions as the composite. During this step, the dense PVA film comes off the glass plate. The membrane is washed with deionized water until no sodium carbonate is found in the washing solution.

The flux and rejection properties of both the composite and dense film (13 μm wet film thickness) for different solutes are given in Table 1. The operating pressure is 30 bar, pH is 7.0, and ambient temperature.

TABLE 1

| Solute | Concentration % | Composite Membrane Flux l/m$^2$·h | Composite Membrane Rejection % | Unsupported Membrane Flux l/m$^2$·h | Unsupported Membrane Rejection % |
|---|---|---|---|---|---|
| NaCl | 1 | 48.5 | 41.7 | 21 | 46 |
| CaCl$_2$ | 1 | 26 | 20.6 | 10.7 | 23 |
| Na$_2$SO$_4$ | 1 | 41.8 | 70 | 18.5 | 78.6 |
| Toluene sulfonic acid | 1 | 53.3 | 69.4 | 21.3 | 78.8 |
| Sucrose | 1 | 28.6 | 61.7 | 12.2 | 67 |
| Dye (formula 11) | 1.5 | 30 | 98.8 | 18.8 | 99.94 |
| Dye (formula 12) | 1.5 | 38.3 | 99.4 | 20 | 99.1 |
| Dye | 1.5 | 41 | 99.2 | 24 | 98.1 |

TABLE 1-continued

| Solute | Concentration % | Composite Membrane Flux 1/m²·h | Composite Membrane Rejection % | Unsupported Membrane Flux 1/m²·h | Unsupported Membrane Rejection % |
|---|---|---|---|---|---|
| (formula 13) | | | | | |

Stability:

The composite membrane has been operated at pH values of 2.0, 5.0, 8.0, 12.0 for 3000 hours with constant flux±10%, and rejection±2% for dye of formula (13). The dye solution was changed every 100 hours. The dense membrane failed, on the average, at 100 hours under all pH's.

EXAMPLE 2

A PVA solution described in example 1 is coated on to 5.0 meters of a polypropylene support (30 cm wide) using a usual coater. Four successive layers (with a total dry thickness of 6 micron) are coated and crosslinked and washed as in example 1.

TABLE II

| Solute | Concentration % | Rejection % | Flux 1/m²·h |
|---|---|---|---|
| NaCl | 1 | 40 | 51 |
| Dye (formula 11) | 1.5 | 99.5 | 36 |
| Dye (formula 13) | 10 | 98.6 | 48 |

EXAMPLE 3

A composite membrane as in example 1, except that the dye of formula (2) is used. The flux and rejection properties are given in Table III.

TABLE III

| Solute | Concentration % | Rejection % | Flux 1/m²·h |
|---|---|---|---|
| NaCl | 1 | 30 | 20.5 |
| Na₂SO₄ | 1 | 62 | 19.3 |
| Toluene sulfonic acid | 1 | 74 | 17 |
| Dye (formula 11) | 1.5 | 98.1 | 14 |
| Dye (formula 12) | 1.5 | 99.6 | 13 |

EXAMPLE 4

As in example 1, except that the dye of formula (3) is used. The flux/rejection properties are given in Table IV.

TABLE IV

| Solute | Concentration % | Rejection % | Flux 1/m²·h |
|---|---|---|---|
| NaCl | 1 | 24 | 50 |
| Na₂SO₄ | 1 | 51 | 46 |
| Dye (formula 11) | 1.5 | 97 | 36 |
| Dye (formula 12) | 1.5 | 93 | 40 |
| Dye (formula 13) | 1.5 | 90 | 45 |

EXAMPLE 5

As in example 1, except that the dye of formula (4) is used. The flux/rejection properties are given in Table V.

TABLE V

| Solute | Concentration % | Rejection % | Flux 1/m²·h |
|---|---|---|---|
| NaCl | 1 | 32 | 47 |

TABLE V-continued

| Solute | Concentration % | Rejection % | Flux 1/m²·h |
|---|---|---|---|
| Na₂SO₄ | 1 | 42 | 48 |
| Toluene sulfonic acid | 1 | 48 | 44 |
| Dye (formula 11) | 1.5 | 98.4 | 28 |
| Dye (formula 12) | 1.5 | 97.1 | 36 |
| Dye (formula 13) | 1.5 | 94 | 40 |

EXAMPLE 6

Example 1 is repeated, where the counterion of the dye of formula (1) is varied with Li⁺, Na⁺, NH₄⁺, K⁺, Cs⁺ and tetramethyl ammonium (TMA). The counterions are changed by eluting a solution of dye (2.5 g per 20 ml deionized water) through a DOWEX ®50W (ion exchange resins with strongly acidic active exchange groups) column containing the desired counterion. The eluted solution is dried under vacuum and then used for making the PVA-dye solution described in example 1. The flux/rejection properties of the membranes with different counterions towards the dye of formula (13) are given in Table VI.

TABLE VI

| Counterion | Flux 1/m²·h | Rejection % |
|---|---|---|
| Li⁺ | 43.6 | 98.5 |
| Na⁺ | 35 | 99.3 |
| NH₄⁺ | 38.3 | 97.7 |
| K⁺ | 53.3 | 99.5 |
| Cs | 55.4 | 98.7 |
| TMA | 60.8 | 98.3 |

EXAMPLE 7

The porous support of example 1 is a polypropylene material with rectangular pores (pore dimensions are approximately (0.04×4 μm). Example 1 is repeated, using different microporous supports, the flux/rejection properties towards the dye of formula (13), 15 000 ppm at 30 bar, is given in Table VII.

TABLE VII

| Material | Pore size (micron) | Flux 1/m²·h | Rejection % |
|---|---|---|---|
| 1. Acrylonitrile polymer on a nylon net (ACROPOR ® Trademark) | 0.2 | 13 | 99.58 |
| 2. Cellulosic base (METRICEL Trademark) | 0.2 | 26.8 | 99.78 |
| 3. Polysulfone | 0.15 | 10.57 | 99.83 |

EXAMPLE 8

Example 1 is repeated with the exception that membranes with different numbers of coatings (1, 2, 3 and 4) of PVA-dye solution are applied. The effect of different numbers of coatings on the flux/rejection properties to a 15,000 ppm solution of dye of formula (13), 30 bar, pH 7, are shown in Table VIII.

TABLE VIII

| No. of coatings | Rejection % | Flux 1/m²·h |
|---|---|---|
| 1 | 63.1 | 114 |
| 2 | 93.3 | 70 |
| 3 | 98.86 | 56 |

TABLE VIII-continued

| No. of coatings | Rejection % | Flux $l/m^2 \cdot h$ |
| --- | --- | --- |
| 4 | 99.76 | 48 |

EXAMPLE 9

The composite membrane of example 8 containing one coated layer of PVA-dye solution is further modified by the following sequence of chemical reactions: The membrane is placed in a bath of petroleum ether (B.P. fraction 60°–80° C.) containing 2% cyanuric chloride and a 2% suspension of sodium bicarbonate for 2 hours at room temperature. The membrane is then rinsed with ice water for 1 hour, and placed in an aqueous solution of 10% polyethylenimine at pH 10.8 for ½ hour at room temperature. The membrane is then rinsed for 1 hour under tap water and placed in an aqueous solution containing 10% NaCl and 1% dye of formula (5) for 15 minutes at room temperature. The membrane is then placed in an aqueous solution containing 2% sodium carbonate for 30 minutes and then rinsed with 10% acetic acid. The thus modified membrane has a rejection and flux of 93% and 85 $l/m^2 \cdot h$, respectively, for dye of formula (13) (15,000 ppm) at 30 bar pressure.

EXAMPLE 10

The modification of example (9) is repeated on the composite membrane of example 8, containing two coatings. The rejection and flux of dye of formula (13) (15,000 ppm aqueous solution), under the conditions of example 9, are 99.9% and 27 $l/m^2 \cdot h$, respectively.

EXAMPLE 11

Example 9 is repeated, but the membrane is first conditioned in 5% NaHCO₃ for 15 minutes, and with the further change that instead of using polyethylenimine of 30,000 average molecular weight, a polyethylenimine of molecular weight 189 is used in a 20% solution at pH 10.8 for 2 hours and room temperature. The resulting rejection and flux to dye of formula (13) (15,000 ppm aqueous solution), under the testing conditions of example 9, are 88% and 27 $l/m^2 \cdot h$, respectively.

EXAMPLE 12

Example 9 is repeated, with the modification of pretreating the membrane with NaHCO₃ as in example 11, but, instead of using cyanuric chloride, tetrachloropyrimidine is used instead, at the same concentration. The temperature of the reaction steps are the same, except for the bath containing polyethyleneimine, which is raised to 40° C. The flux and rejection properties of the membrane to dye of formula (13) under the same testing conditions of example 9 are 79 $l/m^2 \cdot h$ and 95%, respectively.

EXAMPLE 13

On a porous polypropylene support according to example 1 multiple semipermeable layers are coated. This so obtained membrane is then compared with a single semipermeable layer of equivalent thickness (also coated on a polypropylene support).

A casting bar with a clearance of 50 micron is used to coat a support of 25 micron. The ends of the casting bar extended beyond the support, so that the actual clearance between the casting bar and the support is 25 micron. The casting solution, preparation and solids content are identical to example 1. Thus the dry film thickness of a 10% solution is approximately 2.5 micron. The evaporation procedure of the water from the cast layer (in order to give a dry membrane) is the same as in example 1. The results of multiple vs single layers are given in Table IX. In addition, the effect of changing the support material is also shown.

TABLE IX

| | Single layer coating | | | Multiple layers | | | |
| --- | --- | --- | --- | --- | --- | --- | --- |
| Support | Thickness (micron) | Rejection (15 000 ppm) dyestuff of formula (13) % | Flux $l/m^2 \cdot h$ | No. of layers | Thickness of each layer (micron) | Total thickness (micron) | Rejection % | Flux $l/m^2 \cdot h$ |
| 1. Polypropylene | 2.5 | 88.3 | 53.3 | | | | | |
| (as in Example 1) | 5.0 | 90.3 | 39.5 | 2 | 2.5 | 5.0 | 98 | 21.9 |
| Pore size | 7.5 | 90.8 | 47.6 | 3 | 2.5 | 7.5 | 99.04 | 24.0 |
| 0.2 × 0.04 micron | 10 | 91.1 | 39.3 | 4 | 2.5 | 10.0 | 99.2 | 23 |
| 2. Acrylonitrile | 5 | 19 | 123.0 | | | | | |
| on a nylon web | 7.5 | 51 | 10.5 | | | | | |
| (ACROPOR-Trademark) | 10 | 53 | 58.0 | 2 | 5.0 | 10.0 | 99.6 | 20.4 |
| Pore size | 20 | 90 | 12.6 | 4 | 5.0 | 20.0 | 99.9 | 9.4 |
| 0.2 micron | 27.5 | 99 | 7.0 | 4 | 5.0 + 2.5 | 27.5 | 99.9 | 8 |
| 3. Cellulosic base | 5.0 | 99.8 | 30.4 | | | | | |
| (METRICEL-Trademark) | 7.5 | 99.84 | 18 | | | | | |
| Pore size | 10 | 99.7 | 17 | 2 | 5.0 | 10.0 | 99.9 | 17 |
| 0.15 micron | 20 | 99.89 | 15.5 | 4 | 5.0 | 20.0 | 99.9 | 12 |

From Table IX it may be seen that for supports 1 and 2 multiple coatings are superior in rejection to membranes with equivalent single coatings. The results on support 3 indicate equivalent rejections for either single or multiple layer coatings. This support is, however, a cellulosic material, and does not have the chemical stability of support 1 or 2. In this regard, the multiple coating approach appears to be a unique application for certain supports and with respect to final flux and rejection and with respect to chemical stability, the combination of casting method with support 1 give the best results.

Support 1 is further superior to other support materials with respect to elasticity. In the fabrication of tubular membranes from flat sheets via spiral winding, the tubular material should have some elasticity, because the tubes expand upon the application of pressure. To test PVA coated supports, an Instron tester was used to stretch the PVA-support membrane at a constant rate. The results are given in Table X.

TABLE X

| Support[1] | Max. strain just before tearing (%) | Flux l/m²·h Before | Flux l/m²·h After | Rejection % Before | Rejection % After |
|---|---|---|---|---|---|
| 1 | 19.23 (Material showed no indication of tearing) | 39 | 34 | 99.1 | 99.1 |
| Polysulfone HT-100 ® | 5.3 | 7.2 | 3.3 | 99.7 | 99.7 |
| 2 | 5.4 | 14.5 | 13.1 | 99.56 | 99.12 |
| 3 | 4.5 | 18 | 27 | 99.9 | 99.6 |

[1]Supports 1, 2 and 3 as in Table IX.

Although some stretching of all supports could be tolerated without loss of flux or rejection, only the support 1 can be stretched above 6% without tearing. In fact, at 20% stretch, this support shows no sign of tearing.

To show that the use of multiple casting of PVA on this support is unique to the PVA system, cellulose acetate is coated from acetone (10% cellulose acetate w/v) on this support as multiple or in equivalent single layers. The results are given in Table XI. The membrane is tested with a 10 mM sodium chloride solution at 40 bar.

TABLE XI

| Single layer | | | Multiple layers | | | | |
|---|---|---|---|---|---|---|---|
| Thickness (micron) | Flux l/m²·h | Rejection % | No. of layers | Thickness of each layer (micron) | Total thickness (micron) | Flux l/m²·h | Rejection % |
| 7.5 | 14.3 | 81.7 | 3 | 2.5 | 7.5 | 6.04 | 78.3 |
| 12.5 | 3.08 | 68 | 5 | 2.5 | 12.5 | 5.8 | 72 |

It can be seen from Table XI that there is little difference in the rejection properties of a cellulose acetate membrane formed on support 1 via multiple casting layers versus a single equivalent layer.

EXAMPLE 14

As described in example 1, 5 layers are coated onto a support under rapid evaporation to achieve, a composite membrane with a rejection and flux of 99.1% and 35 l/m²·h, respectively. In another case, the layers are dried under ambient conditions. The membrane has a rejection of 95% and flux of 35 l/m²·h. The difference of 4% in rejection is significant, because it represents an 80% reduction in dye permeating the membrane. The rejection is tested with an aqueous 15 000 ppm solution of the dyestuff of formula (13) at 25 bars.

This example clearly shows the effect of the evaporation rate during multiple coating.

EXAMPLE 15

PVA with a degree of saponification of 99.9 mole % and a degree of polymerization of 1.700 and polyethyleneglycol with an average M.W. of 2,000, are dissolved in water under heating at 100° C. to prepare a homogeneous aqueous solution (concentration of PVA=16%).

The above solution is then used to cast on a microporous support of polypropylene. A strip of this support (5×20 cm) is adhered with slight tension at both ends with pressure sensitive tape to a glass plate, 5.0 ml of PVA casting solution is applied to one end, and a glass rod pulled from behind this solution down the length of the support strip, while the said rod rests on the support. The PVA solution is thus coated upon the support. Instead of a glass rod, a doctor knife with a 50 μm thickness may be used.

After casting the membrane, it was immersed immediately into an aqueous coagulation solution bath (300 g/l NaOH), then neutralized with an hydrochloric acid and conditioned with an aqueous sodium sulfate solution at pH 7.

The thus formed porous composite PVA membrane having a water flux of 500·10⁻² ml/cm²·h at 1 bar is modified according to the method described in Example 9.

The thus modified membrane has a rejection of 90% and flux of 90 l/m²·h respectively for the dye of formula (13) (1500 ppm aqueous solution) at 30 bars pressure. The non-modified membrane has a flux of 200 l/m²·h at 10 bars and a rejection of 40% to the same dye.

EXAMPLE 16

Example 1 is repeated using the dye of the formula (9) instead of dye of formula (1).

The PVA-CELGARD® composite as defined above is placed in 20% sodium carbonate at 90° C. (instead of 80° C., as in example 1) and 45 minutes instead of 20 minutes.

The flux and rejection properties of the composite membrane is given in Table I. Test conditions are those of example 1.

TABLE XII

| Solute | Concentration % | Flux l/m²·h | Rejection % |
|---|---|---|---|
| NaCl | 1.0 | 34 | 32 |
| Dye formula (11) | 1.5 | 21 | 96 |
| Dye formula (13) | 0.5 | 30 | 97 |

EXAMPLE 17

Example 1 is repeated using the compound of formula (10) instead of dye of formula (1). The concentration of this compound in solution is 3% (w/volume). The resultant composite had a rejection of dye of formula (12) (0.2% aqueous solution) of 97.6% and a flux of 16 l/m²·h under 30 bar, pH 7.0 at room temperature. The rejection and flux to 1% NaCl was 46% and 25 l/m²·h, respectively.

EXAMPLE 18

Example 17 is repeated using the reactive cationic compound of the formula (8) instead of the anionic compound of formula (10). The flux and rejection properties (test conditions as in example 17) of the composite membrane are given in Table XIII.

TABLE XIII

| Solute | Concentration % | Rejection % | Flux l/m²·h |
|---|---|---|---|
| NaCl | 1.0 | 31 | 23 |
| CaCl₂ | 1.0 | 49 | 18 |
| Dye formula (14) | 0.15 | 95 | 9 |

EXAMPLE 19

A solution of polyvinylalcohol (without a dyestuff) is cast (two layers) on a polypropylene support and dried as indicated in example 1.

The obtained composite membrane with two PVA-layers is then modified as follows:

The membrane is placed in a bath of petroleum ether (B.P. fraction 60° to 80° C.) containing 2% cyanuric chloride and a 2% suspension of sodium bicarbonate for 2 hours at room temperature, rinsed with ice water for 1 hour and placed in an aqueous solution of 10% polyethylenimine (MW 30.000) at a pH-value of 10.8 for ½ hour at room temperature, rinsed again for 1 hour under tap water and placed in an aqueous solution containing 10% NaCl and 1% dye of formula (5) for 15 minutes at room temperature. The membrane is then placed in an aqueous solution containing 2% sodium carbonate for 30 minutes and rinsed with 10% aqueous acetate acid. Membrane performance before and after modification is given in Table XIV.

TABLE XIV

| | | Before modification | | After modification | |
|---|---|---|---|---|---|
| Solute | Concentration % | Flux $1/m^2 \cdot h$ | Rejection % | Flux $1/m^2 \cdot h$ | Rejection % |
| NaCl | 1 | 75 | 22 | 33 | 39 |
| Dye formula (12) | 1.5 | 53 | 86 | 18 | 98 |
| Dye formula (13) | 1.5 | 68 | 82 | 24 | 96 |

(Test conditions: 30 bar, room temperature, pH-value 7.0)

EXAMPLE 20

Example 10 is repeated, with the exception that the PVA solution also includes polyethyleneglycol (PEG) of MG 2000. The concentration of PEG is 5%. The resultant membrane, after the alkali treatment, is kept in water for 3 hours to leach out the unreacted PEG, and then modified according to the procedure described in Example 19. The resultant membrane has a rejection and flux to 1.5% of dye of formula (13) of 90% and 42 $1/m^2 \cdot h$, respectively. Before modification rejection and flux were 79% and 69 $1/m^2 \cdot h$.

EXAMPLE 21

Example 10 is repeated with the difference that instead of the dye of formula (5) being used to cross-link the polyethylenimine layer, the compound of formula (8) is used. The rejection and flux of dye of formula (13) (15,000 ppm aqueous solution, under 30 bar, pH 7.0 and room temperature) are 98.6% and 19 $1/m^2 \cdot h$, respectively.

EXAMPLE 22

A 15% solution of the copolymer poly(vinylalcohol-vinylpyrrolione) (75:25) containing 15% of the reactive dye of formula (7) is prepared and cast as in example 1. The resultant composite of four layers of the copolymer on the polypropylene support (CELGARD ®) has a flux and rejection to the dye of formula (13) (1.5%) of 42 $1/m^2 \cdot h$ and 96%, respectively.

EXAMPLE 23

A solution of 5% PVA (97 mls) is cooled to 0° 5° C. About 3 mls of a 3% solution of the compound of formula (10 c) in acetone are introduced dropwise into the vigorously stirred solution of PVA. Four layers of the solution prepared in this manner are cast on a polypropylene support and dried as in Example 1.

The membrane modified with the compound of formula (10c) (a nonionic cross-linking component (c")) is then immersed for cross-linking into a 20% solution of sodium carbonate at 80° C. for 20 minutes, rinsed for 1 hour on the tap-water and then modified by first immersing the membrane in an aqueous solution of 10% sodium chloride and 1% dye of formula (5) for 15 minutes at room temperature. The membrane is then placed in an aqueous solution containing 2% of sodium carbonate for 30 minutes and then rinsed with 10% aqueous acetic acid.

The cross-linking unmodified (no reaction with the dyestuff) and modified membrane are tested in a solution of 1500 ppm of the dye of formula (13).

Unmodified membrane: Flux/Rejection: 32.4 $1/m^2 \cdot h$—91%. Modified membrane: 20 $1/m^2 \cdot h$—97%.

EXAMPLE 24

A solution of 5% PVA as in Example 23 containing 2% (w/w) polyethyleneglycol (2000) and instead of the compound of formula (10c) the compound of formula (10b) is prepared.

A membrane is prepared by coating four successive layers with this solution. The membrane is then, immersed in cold water for 30 minutes to leach out the polyethyleneglycol and then cross-linked in 20% sodium carbonate solution at 80° C. for 20 minutes. This membrane is then further modified and tested as in Example 23.

Results: Unmodified membrane: Flux/Rejection: 116 $1/m^2 \cdot h$—57%. Modified membrane: 77 $1/m^2 \cdot h$—90%.

We claim:

1. A semipermeable composite membrane containing on one surface of a porous support a superficial thin film having semipermeable properties of chemically modified PVA/PVA-copolymers, the film being obtainable by casting an aqueous solution of PVA/PVA-copolymers and a leachable water-soluble additive on the support, treating it in an aqueous alkaline solution and rinsing it and reacting the film with components.

(a) a reactive component selected from the group consisting of monomeric organic compounds that contain reactive multiple bonds or reactive epoxide aziridine, aldehyde, imidate, isocyanate, isothiocyanate, hydroxyl, anhydride, acyl halide or N-methylol groups; and compounds having detachable substituents, the compounds having detachable substituents being selected from the group consisting of compounds containing substituents which can be split off as tertiary amines and compounds containing substituents which can be split off as anions, (b) a linear or branched polyfunctional oligomer or polymer which contains functional groups selected from the group consisting of aliphatic and aromatic amino groups, hydroxyl groups, thiol groups, isocyanate groups and thioisocyanate groups, and (c) a reactive colorless or colored compound containing at least one reactive group and ionisable groups 2. A semipermeable composite membrane containing on one surface of a porous support a superficial thin film having semipermeable properties of chemically modified PVA/PVA-copolymers, said film being obtainable by
I. casting an aqueous solution of PVA/PVA-copolymer, a cross-linking agent (c") containing at least two functional groups on said porous support, cross-linking it, and then reacting it with components
II. (a) a reactive component selected from the group consisting of monomeric organic compounds that contain reactive multiple bonds or reactive epoxide, aziridine, aldehyde, imidate, isocyanate, isothiocyanate, hydroxyl, anhydride, acyl halide or N-methylol groups; and compounds having detachable substituents, said compounds having detachable substituents being selected from the group consisting of compounds containing substituents which can be split off as tertiary amines and compounds containing substituents which can be split off as anions,
(b) a linear or branched polyfunctional oligomer or polymer which contains functional groups selected from the group consisting of aliphatic and aromatic amino groups, hydroxyl groups, thiol groups, isocyanate groups and thioisocyanate groups, and
(c) a reactive colorless or colored compound containing at least one reactive group and ionisable groups.

3. A composite membrane according to claims 1 or 2, wherein the porous support is of polyolefines, polyacrylonitriles, polyamides, polysulfones or cellulosic materials.

4. A composite membrane according to claim 3, wherein the porous support is of polypropylene.

5. A composite membrane according to claims 1 or 2, wherein the semipermeable film has a thickness of at least about 0.5 micron.

6. A composite membrane according to claim 1, wherein said reactive component is a reactive compound (dyestuff), the reactive groups are di- or trihalogenated pyrimidinyls or dihalogenated 1,3,5-triazinyls or 1,4-quinoxalinyls and ionisable groups are sulfonic or carboxylic acid or ammonium groups.

7. A composite membrane according to claim 1 or 2, wherein said reactive component is a halogeno-diazine or -triazine which contains at least two reactive substituents.

8. A composite membrane according to claim 7, wherein said reactive component is cyanuric chloride or tetrachloropyrimidine.

9. A composite membrane according to claim 1 or 2, wherein said reactive linear or branched polyfunctional oligomer or polymer component comprises polyethyleneimines, cellulose derivatives, polyvinylanilines, polyvinylamines or polyvinyl alcohols.

10. A composite membrane according to claim 1 or 2, wherein said reactive component is a reactive compound dye, the reactive groups are halogenated 1,4-quinoxalinyls, pyrimidinyls or 1,3,5-triazinyls and the ionisable groups are sulfonic, carboxylic acid or ammonium groups.

11. A composite membrane according to claim 2, wherein said cross-linking agent (c") is ionic or non-ionic and has the meaning of components (a) or (c).

12. A composite membrane according to any of claims 1 or 2, wherein after modification the pore size is of 10 to 1000 Å.

13. A composite membrane according to claim 12, wherein after modification the pore size is of 10 to 200 Å.

14. A process for manufacturing a composite membrane according to claim 1, which comprises casting on one surface of a porous support an aqueous solution containing PVA/PVA-copolymers, and a leachable water-soluble additive treating the obtained film in a aqueous alkaline solution, rinsing the film and reacting the film with components
(a) a reactive component selected from the group consisting of monomeric organic compounds that contain reactive multiple bonds or reactive epoxide, aziridine, aldehyde, imidate, isocyanate, isothiocyanate, hydroxyl, anhydride, acyl halide or N-methylol groups; and compounds having detachable substituents, said compounds having detachable substituents being selected from the group consisting of compounds containing substituents which can be split off as tertiary amines and compounds containing substituents which can be split off as anions,
(b) a linear or branched polyfunctional oligomer or polymer which contains functional groups selected from the group consisting of aliphatic and aromatic amino groups, hydroxyl groups, thiol groups, isocyanate groups and thioisocyanate groups, and
(c) a reactive colorless or colored compound containing at least one reactive group and ionisable groups.

15. A process for manufacturing a composite membrane according to claim 2, which comprises casting on one surface of a porous support an aqueous solution containing PVA/PVA-copolymers, a cross-linking agent (c") containing at least two functional groups, cross-linking the obtained film and then reacting it with components
(a) a reactive component selected from the group consisting of monomeric organic compounds that contain reactive multiple bonds or reactive epoxide, aziridine, aldehye, imidate, isocyanate, isothiocyanate, hydroxyl, anhydride, acyl halide or N-methylol groups; and compounds having detachable substituents, said compounds having detachable substituents being selected from the group consisting of compounds containing substituents which can be split off as tertiary amines and compounds containing substituents which can be split off as anions,
(b) a linear or branched polyfunctional oligomer or polymer which contains functional groups selected from the group consisting of aliphatic and aromatic amino groups, hydroxyl groups, thiol groups, isocyanate groups and thioisocyanate groups, and
(c) a reactive colorless or colored compound containing at least one reactive group and ionisable groups.

16. A process according to claim 14 or 15, wherein the stream of warm air has a temperature of 70° to 150° C., the evaporation time is less than 1 second and drying the coating is carried out at temperatures of 70° to 90° C.

17. A process according to claim 15, wherein the cross-linking agent (c−) is an ionic or non-ionic compound and has the meaning (a) or (c).

18. A process according to claim 17, wherein the cross-linking agent contains as reactive groups dihalogenated 1,3,5-triazinyl, di- or trihalogenated pyrimidinyl or dihalogenated 1,4-quinoxalinyl radicals and as ionic groups sulfonic acid, carboxylic acid or ammonium groups.

19. A process according to claim 14 or 15, wherein component (a) is a cyclic carbonic acid imide-halide.

20. A process according to claim 19, wherein component (a) is a halogeno-diazine or triazine which contains at least two reactive substituents.

21. A process according to claim 20, wherein component (a) is cyanuric chloride or tetrachloropyrimidine.

22. A process according to claim 14 or 15, wherein component (b) comprises polyethyleneimines, cellulose derivatives, polyvinylanilines, polyvinylamines or polyvinyl alcohols.

23. A process according to claims 14 or 15, wherein compound (c) is a colored compound.

24. A process according to claim 23, wherein component (c) is a reactive dye, the reactive groups being halogenated 1,4-quinoxalinyls, pyrimidinyls or 1,3,5-triazinyls and the ionisable groups are sulfonic acid, carboxylic acid or ammonium groups.

25. A process according to any one of claims 14 or 15, wherein a flat membrane or a tubular membrane is prepared.

26. A process for purifying liquids by separating components dissolved in these liquids which comprises disposing a solution with a solute on one side of a semipermeable membrane according to claim 1 or 2 and filtering said solution by applying a hydraulic pressure against said solution and said membrane, said pressure being greater than the osmotic pressure of said solution.

27. A process according to claim 26, which comprises separating monovalent ions of low ionic weight from, polyvalent ions of low or high ionic weight or from monovalent ions of high ionic weight.

28. A process according to claim 27, wherein organic and metal-organic substances are separated from by-products of a reaction mixture.

29. A process according to claim 27, wherein heavy metal complexes are separated from salts which do not form complexes.

30. A process according to claim 29, wherein organic dyestuffs and metal-complexes of dyestuffs are separated from low molecular inorganic salts.

31. A process according to claim 27, wherein effluents obtained from dye production are purified by separating off the dyes.

32. A process according to claim 27, which comprises separating ionic substances from nonionic substances.

33. A process according to claim 27, which comprises separating ions of opposite charge.

34. A process according to claim 27, which comprises separating from one another ionic compounds which are of opposite charge and have different molecular weights.

* * * * *